US012525720B2

(12) United States Patent
Wang et al.

(10) Patent No.: US 12,525,720 B2
(45) Date of Patent: Jan. 13, 2026

(54) TOKAMAK OUTER ANTENNA

(71) Applicant: Anhui Agricultural University, Hefei (CN)

(72) Inventors: Yaoyao Wang, Hefei (CN); Qing Zhou, Hefei (CN); Zhenxing Wang, Hefei (CN); Chengzhou Liu, Hefei (CN); Liang Zhu, Hefei (CN); Wendong Ma, Hefei (CN); Jiafang Shan, Hefei (CN)

(73) Assignee: Anhui Agricultural University, Hefei (CN)

( * ) Notice: Subject to any disclaimer, the term of this patent is extended or adjusted under 35 U.S.C. 154(b) by 642 days.

(21) Appl. No.: 18/055,952

(22) Filed: Nov. 16, 2022

(65) Prior Publication Data

US 2024/0030613 A1 Jan. 25, 2024

(30) Foreign Application Priority Data

Jul. 21, 2022 (CN) ......................... 202210864091.8

(51) Int. Cl.
*H01Q 13/10* (2006.01)
*G21B 1/05* (2006.01)
*H05H 1/46* (2006.01)

(52) U.S. Cl.
CPC ............ *H01Q 13/10* (2013.01); *H05H 1/463* (2021.05); *G21B 1/057* (2013.01)

(58) Field of Classification Search
CPC ........ H05H 1/463; H01Q 13/10; H01Q 13/28; Y02E 30/10
See application file for complete search history.

(56) References Cited

U.S. PATENT DOCUMENTS

2005/0179592 A1* 8/2005 Shafai ...................... H01Q 1/48
343/700 MS
2013/0141271 A1* 6/2013 Mobius .................. H01Q 13/28
342/175

OTHER PUBLICATIONS

H. Torreblanca, "A high power helicon antenna for the DIII-D tokamak and its electromagnetic aspects", Fusion Engineering and Design 146 (2019) pp. 626-630 (Year: 2019).*

* cited by examiner

*Primary Examiner* — Thien S Tran
(74) *Attorney, Agent, or Firm* — HoustonHogle LLP

(57) ABSTRACT

Disclosed is a Tokamak outer antenna, comprising feed waveguides, brims, sub-waveguides and a metal base. The metal base is in a W shape, both ends of the metal base are connected to the lower surfaces of feed waveguides, respectively. Opposite sides of two feed waveguides are connected to the brims, respectively, and a plurality of sub-waveguides are arranged on the upper surface of the metal base at equal intervals. The height of each sub-waveguide is not higher than the height of the feed waveguide, one feed waveguide serves as a microwave input port, and the other feed waveguide serves as a microwave output port. The Tokamak outer antenna disclosed by the present disclosure is a novel antenna which is simple in feed, low in reflection and transmission coefficients and high in directivity.

9 Claims, 3 Drawing Sheets

TOKAMAK OUTER ANTENNA

CROSS-REFERENCE TO RELATED APPLICATION

This patent application claims the benefit and priority of Chinese Patent Application No. 202210864091.8, filed with the China National Intellectual Property Administration on Jul. 21, 2022, the disclosure of which is incorporated by reference herein in its entirety as part of the present application.

TECHNICAL FIELD

The present disclosure relates to the technical field of outer antennas, and in particular relates to a Tokamak outer antenna.

BACKGROUND

Low-hybrid wave current driving, which has been experimentally proven internationally, is one of the most effective non-inductive current driving methods for Tokamak fusion. Antenna, as an important core component of the system, has an important role in feeding power into the plasma. At present, the conventional large Tokamak devices internationally generally use multi junction waveguide array antenna with the parallel refractive index $n_{11}$ less than 3 in general, e.g., EAST, HL-1, JET, etc. Since 1990, Japan and other countries have developed a spherical Tokamak, which is relatively small in dimension and has achieved a certain effect by taking Ion Cyclotron radio frequency (ICRF) as a main driving mode, proving the feasibility of small Tokamak.

With compactness, no pollution and low cost as the main research orientation, the spherical Tokamak aims to commercialize fusion energy within three decades. At present, the conventional multi junction waveguide array antenna cannot satisfy the spherical Tokamak due to its small parallel refractive index and incapability of penetrating the plasma layer with large density to reach the plasma core region, so the antenna technology in this field is basically blank and a meaningful technical problem needing to be solved urgently.

SUMMARY

An objective of the present disclosure is to provide a Tokamak outer antenna to solve the problem of low-hybrid wave current driving of a small Tokamak in the prior art, such that a metal antenna is simple in feed, low in reflection and transmission coefficients, and high in directivity.

To achieve the objective, the present disclosure provides the following solutions:

The present disclosure provides a Tokamak outer antenna. The antenna comprises feed waveguides, brims, sub-waveguides, and a metal base. The metal base is in a W shape, both ends of the metal base are connected to the lower surfaces of the feed waveguides, respectively. Opposite sides of the two feed waveguides are connected to the brims, respectively. A plurality of sub-waveguides are arranged on the upper surface of the metal base at equal intervals. The height of each sub-waveguide is not higher than the height of the feed waveguide. One feed waveguide serves as a microwave input port, and the other feed waveguide serves as a microwave output port.

Preferably, a through opening of the feed waveguide is rectangular, the top surface of the feed waveguide is flush with the top end of the metal base, and an initial height of the sub-waveguide is not higher than the bottom surface of the feed waveguide.

Preferably, the brims are in an inverted U shape and are symmetrically connected to the feed waveguides at the two ends. The top surfaces of the brims are flush with the top surfaces of the feed waveguides, the two side surfaces of the brims are both right triangles, and the two side surfaces of the brims are both connected to the side walls of the feed waveguides.

Preferably, a bottom plate of the metal base is in an arch shape. Two stepped surfaces are symmetrically arranged on the bottom plate, two ends of each stepped surface are planes, and the vertical lengths of the sub-waveguides arranged on the bottom plate are the same and range from 0 mm to 100 mm.

Preferably, each step of the stepped surface has a height of 0 mm to 100 mm, the feed waveguide has a length of at least 100 mm and a width of at least 20 mm. The brim has a length of at least 20 mm in a microwave conduction direction.

Preferably, a radiation slot between two adjacent sub-waveguides is filled with air or vacuum. The number of the radiation slots is at least 16, and the radiation slots each have a width of 0 mm to 100 mm and a depth of 0 mm to 100 mm.

Preferably, the number of the radiation slots is 28, and the radiation slots each have a depth of 28 mm.

Preferably, the number of the sub-waveguides is 0 to 100, and the sub-waveguides each have a thickness of 0 mm to 100 mm.

Preferably, the number of the sub-waveguides is 27, the sub-waveguides each have a thickness of 1.5 mm, and a spacing distance between two adjacent sub-waveguides is 5 mm.

Preferably, the feed waveguide, the brim, the sub-waveguide and the metal base are made of copper, aluminum, iron, or stainless steel.

Compared with the prior art, the present disclosure obtains the following technical effects:

The Tokamak outer antenna disclosed by the present disclosure is a novel antenna which is simple in feed, low in reflection and transmission coefficients, and high in directivity. The antenna is compact in arrangement, high in stability, excellent in performance, and is mainly used in the high-average-power microwave system, especially a Tokamak system driven by low hybrid waves.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
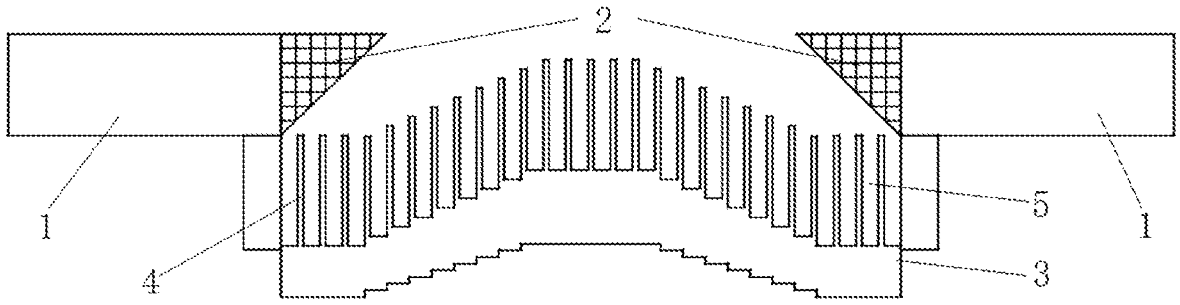
FIG. 1 is a first structure diagram of a Tokamak outer antenna in accordance with the present disclosure.
Figure 2:
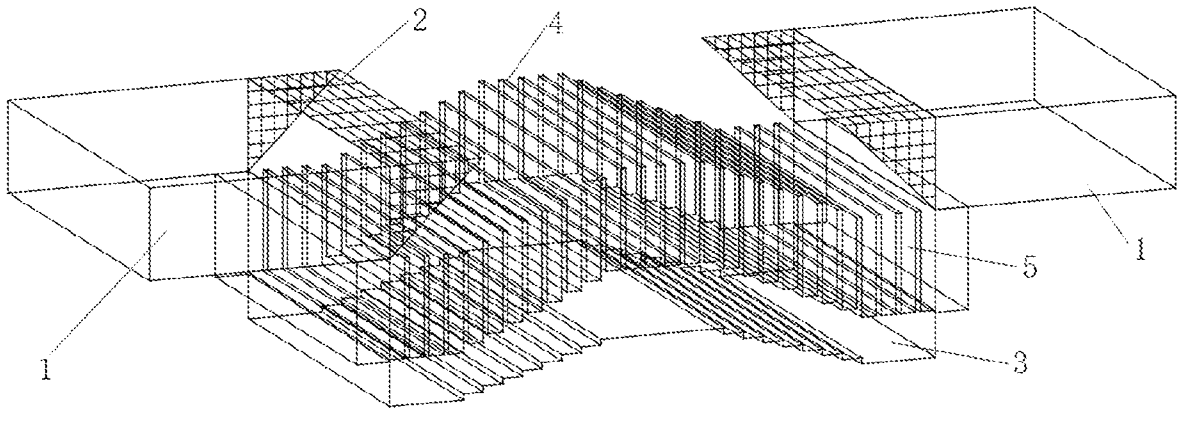
FIG. 2 is a second structure diagram of a Tokamak outer antenna in accordance with the present disclosure.
Figure 3:
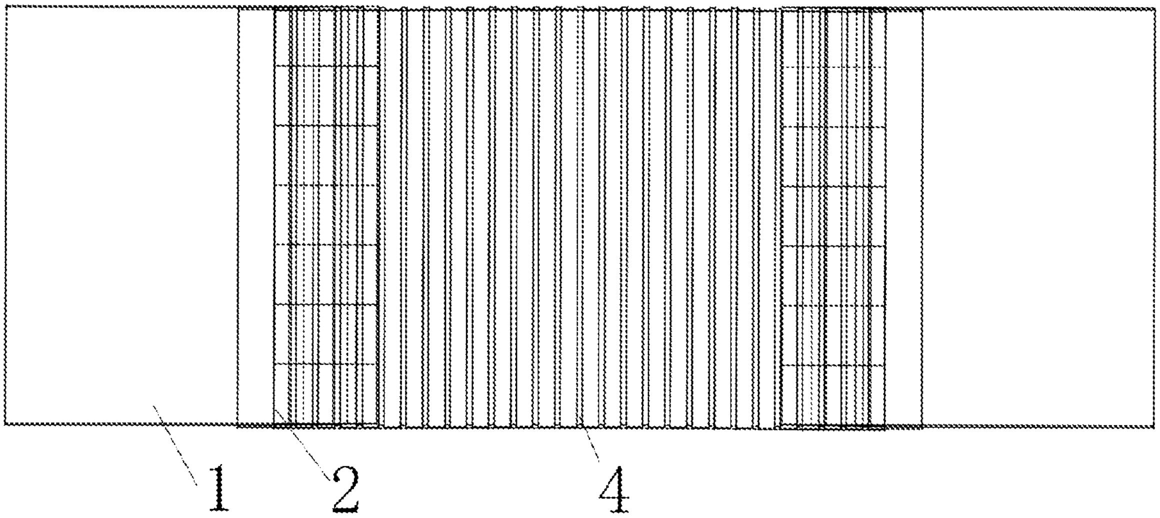
FIG. 3 is a third structure diagram of a Tokamak outer antenna in accordance with the present disclosure.

In the drawings: 1—feed waveguide; 2—brim; 3—metal base; 4—sub-waveguide; 5—radiation slot.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a Tokamak outer antenna to solve the problem of low-hybrid wave current driving of a small Tokamak in the prior art, such that a metal antenna is simple in feed, low in reflection and transmission coefficients, and high in directivity.

To make the objectives, features and advantages of the present disclosure more apparently and understandably, the present disclosure is further described in detail with reference to accompanying drawings and specific embodiments.

As shown in FIG. 1 to FIG. 5, the embodiment provides a Tokamak outer antenna. The Tokamak outer antenna comprises feed waveguide 1, brims 2, sub-waveguides 4, and a metal base 3. The metal base 3 is in a W shape, and both ends of the metal base 3 are connected to the lower surfaces of the feed waveguides 1, respectively. Opposite sides of the two feed waveguides 1 are connected to the brims 2, respectively. A plurality of sub-waveguides 4 are arranged on the upper surface of the metal base 3 at equal intervals. The height of each sub-waveguide 4 is not higher than the height of the feed waveguide 1. One feed waveguide 1 serves as a microwave input port, and the other feed waveguide 1 serves as a microwave output port.

A through opening of the feed waveguide 1 is rectangular, the top surface of the feed waveguide 1 is flush with the top end of the metal base 3, and an initial height of the sub-waveguide 4 is not higher than the bottom surface of the feed waveguide 1. The brims 2 are an inverted U shape and are symmetrically connected to the feed waveguides 1 at the two ends, the top surfaces of the brims 2 are flush with the top surfaces of the feed waveguides 1, the two side surfaces of the brims are right triangles, and the two side surfaces of the brims are connected to the side walls of the feed waveguides 1. To couple the microwave entering from the left port into the antenna and make a field intensity distribution meet the requirement, the brims at the left and right are completely symmetrical.

A bottom plate of the metal base 3 is in an arch shape, two stepped surfaces are symmetrically arranged on the bottom plate, and two ends of each stepped surface are planes. The metal base 3 and the and sub-waveguides 4 are of an integrally formed part, and the vertical lengths of the sub-waveguides arranged on the bottom plate are the same and range from 0 mm to 100 mm. The metal plate with a certain slope can enable the top end of the antenna to close to the plasma as much as possible and can be configured to adjust parallel refractive indexes and S parameters, thus adapting to the plasma at different distances or under different conditions. Each step of the stepped surface has a height of 0 mm to 100 mm. The feed waveguide 1 has a length of at least 100 mm and a width of at least 20 mm. The brim has a length of at least 20 mm in a microwave conduction direction. In the embodiment, each step has a height of 2.25 mm, and the brim 2 has a length of 28 mm. The feed waveguide 1 has a width of 20 mm and a length of 111.5 mm, and the dimension of the feedback guide can be properly adjusted and designed in an allowable range so as to provide enough power for the antenna.

A radiation slot 5 between two adjacent sub-waveguides 4 is filled with air or vacuum. The number of the radiation slots 5 is at least 16, and the radiation slots 5 each have a width of mm to 100 mm and a length of 0 mm to 100 mm. The number of the radiation slots 5 is 28, and the radiation slots 5 each have a depth of 28 mm. The number of the sub-waveguides 4 is 0 to 100, and the sub-waveguides 4 each have a thickness of 0 mm to 100 mm. In the embodiment, the number of the sub-waveguides 4 is 27, and the sub-waveguides 4 each have a thickness of 1.5 mm, and a spacing distance between two adjacent sub-waveguides is 5 mm. The number and dimensions of the sub-waveguides 4 and the radiation slots 5 can be determined and designed according to actual demands. In the embodiment, 28 sub-waveguides 4 and 27 radiation slots 5 are arranged on the metal base 3 in sequence; the widths of the sub-waveguides 4 and the radiation slots 5 are consistent with the wide edge of the feedback waveguide 1; and the maximum height of the sub-waveguide 4 is flush with the height of the brim 2.

The feed waveguide 1, the brim 2, the sub-waveguide 4 and the metal base 3 are made of, but not limited to, copper, aluminum, iron, or stainless steel.

In accordance with the embodiment, the Tokamak outer antenna is a metal antenna which is simple in feed, low in reflection and transmission coefficients, and high in directionality, where the range of the parallel refractive index may be set within the range of 0 to 100. Two rectangular waveguides integrated with the antenna are a microwave input structure and a microwave output structure. Preferably, the antenna, at 2.45 GHz, has a reflection coefficient and a transmission coefficient of both less than −10 dB and a parallel refractive index of 4.0. The antenna has a self-cleaning gas adsorption function by adopting a dual-port structure, and does not need to be aged after an experiment. The antenna is mainly used in a high-average-power microwave system, especially low-hybrid wave driving of Tokamak, where the thickness of the sub-waveguide 4, the depth of the radiation slot 5 and the height of the step supplement each other to jointly determine the performance, the reflection coefficient, the field intensity distribution, the parallel refractive index and the like of the antenna. The antenna, after being machined and molded, can be debugged to achieve the engineering requirements, with an excellent experimental test result.

Figure 4:
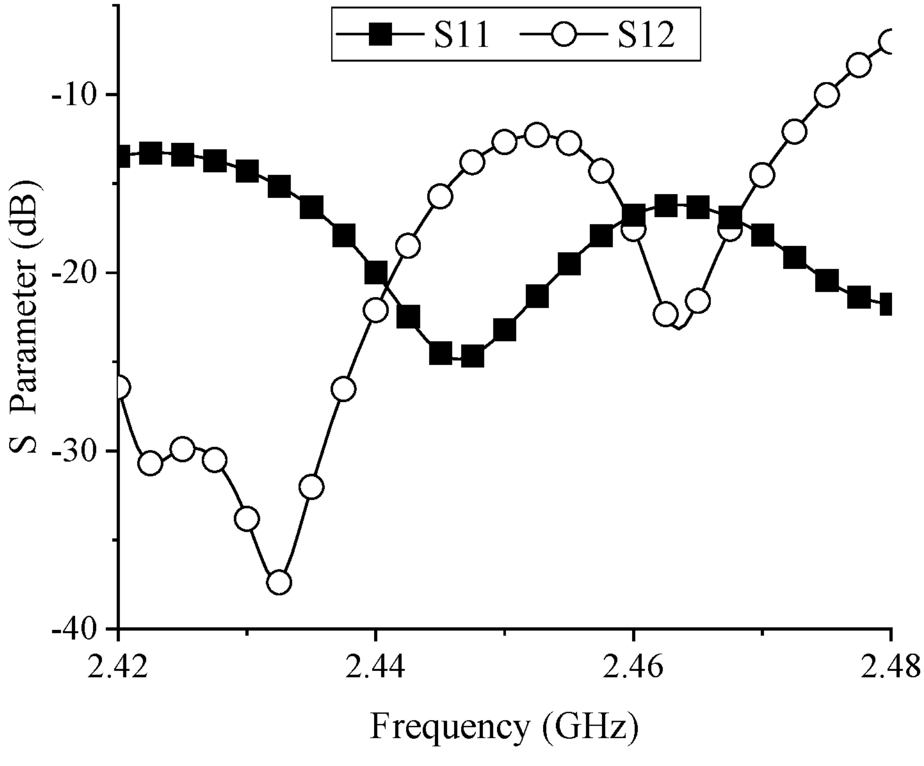
FIG. 4 is a diagram illustrating S parameters of a Tokamak outer antenna in accordance with the present disclosure.

As shown in FIG. 4, a diagram illustrating S parameters of a Tokamak outer antenna in accordance with the present embodiment is provided, including simulation and experimental results. The antenna has a center operating frequency of 2.45 GHz, the S parameters (including reflection coefficient (S11) and transmission coefficient (S12 or S21)) at the point are both less than −10 dB, where about 95% of the microwave energy is radiated into the air, about 5% of the energy exits from the ports of the two feed waveguides 1, and the bandwidth is 10 MHz.

Figure 5:
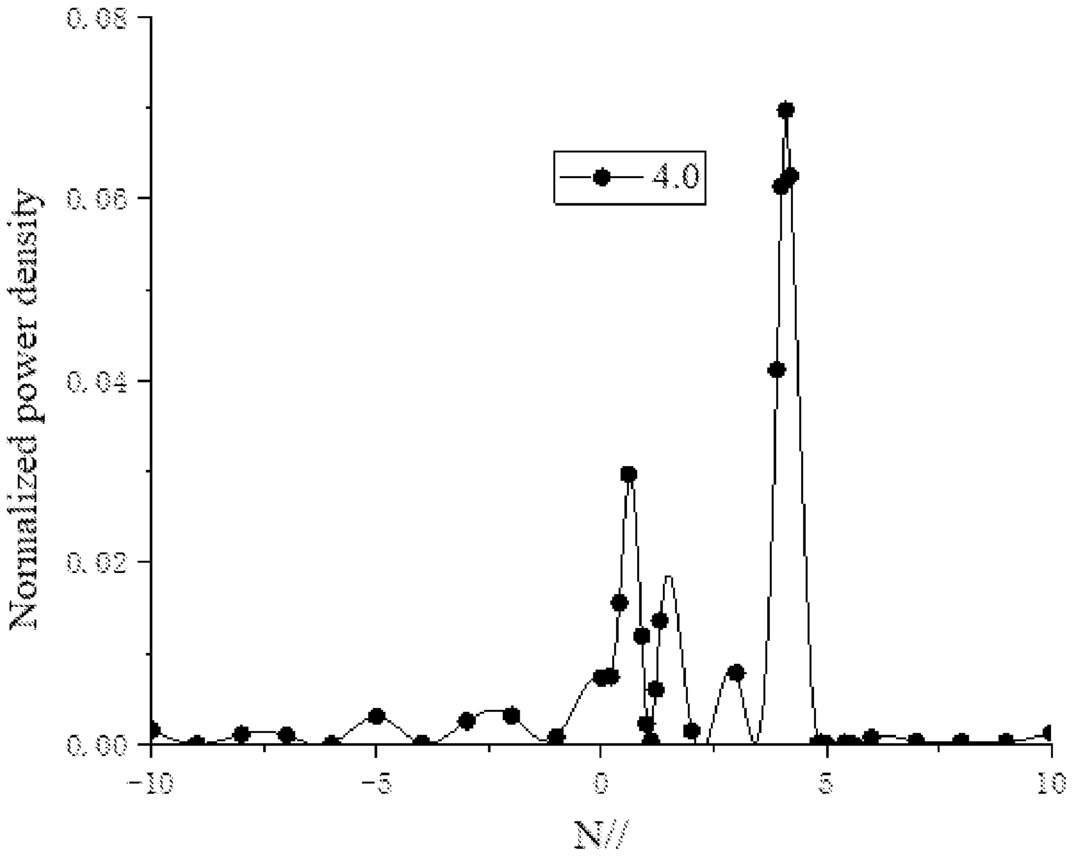
FIG. 5 is a diagram illustrating parallel refractive indexes of a Tokamak outer antenna in accordance with the present disclosure.

As shown in FIG. 5, a diagram illustrating parallel refractive indexes of a Tokamak outer antenna in accordance with the present embodiment is provided. The antenna has a center operating frequency of 2.45 GHz, and the parallel refractive index at the point is 4.0. It is shown from the figure that the directivity of the antenna is excellent, and the simulation and experimental results are basically consistent. The result is allowed to vary slightly with the machining materials (metal such as gold, silver, copper, aluminum, and stainless steel).

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A Tokamak outer antenna, comprising feed waveguides, brims, sub-waveguides, and a metal base, wherein the metal base is in a W shape, both ends of the metal base are connected to lower surfaces of the feed waveguides, respectively; opposite sides of the two feed waveguides are connected to the brims, respectively; a plurality of sub-waveguides are arranged on an upper surface of the metal base at equal intervals; a height of each sub-waveguide is not higher than the height of the feed waveguide; and one feed waveguide serves as a microwave input port, and the other feed waveguide serves as a microwave output port; and wherein a bottom plate of the metal base is in an arch shape, two stepped surfaces are symmetrically arranged on the bottom plate, two ends of each stepped surface are planes, and vertical lengths of the sub-waveguides arranged on the bottom plate are the same and range from 0 mm to 100 mm.

2. The Tokamak outer antenna according to claim 1, wherein a through opening of the feed waveguide is rectangular, a top surface of the feed waveguide is flush with a top end of the metal base, and an initial height of the sub-waveguide is not higher than a bottom surface of the feed waveguide.

3. The Tokamak outer antenna according to claim 1, wherein the brims are in an inverted U shape and are symmetrically connected to the feed waveguides at the two ends, top surfaces of the brims are flush with the top surfaces of the feed waveguides, two side surfaces of the brims are both right triangles, and the two side surfaces of the brims are both connected to side walls of the feed waveguides.

4. The Tokamak outer antenna according to claim 1, wherein each step of the stepped surface has a height of 0 mm to 100 mm, the feed waveguide has a length of at least 100 mm and a width of at least 20 mm; the brim has a length of at least 20 mm in a microwave conduction direction.

5. The Tokamak outer antenna according to claim 1, wherein a radiation slot between two adjacent sub-waveguides is filled with air or vacuum, a number of the radiation slots is at least sixteen, the radiation slots each have a width of 0 mm to 100 mm and a depth of 0 mm to 100 mm.

6. The Tokamak outer antenna according to claim 5, wherein the number of the radiation slots is 28, and the radiation slots each have a depth of 28 mm.

7. The Tokamak outer antenna according to claim 1, wherein a number of the sub-waveguides is 0 to 100, and the sub-waveguides each have a thickness of 0 mm to 100 mm.

8. The Tokamak outer antenna according to claim 7, wherein the number of the sub-waveguides is 27, the sub-waveguides each have a thickness of 1.5 mm, and a spacing distance between two adjacent sub-waveguides is 5 mm.

9. The Tokamak outer antenna according to claim 1, wherein the feed waveguide, the brim, the sub-waveguide and the metal base are made of copper, aluminum, iron, or stainless steel.

* * * * *